June 26, 1934.                H. T. SEELEY                1,964,536
                              CONTROL SYSTEM
                            Filed May 1, 1929
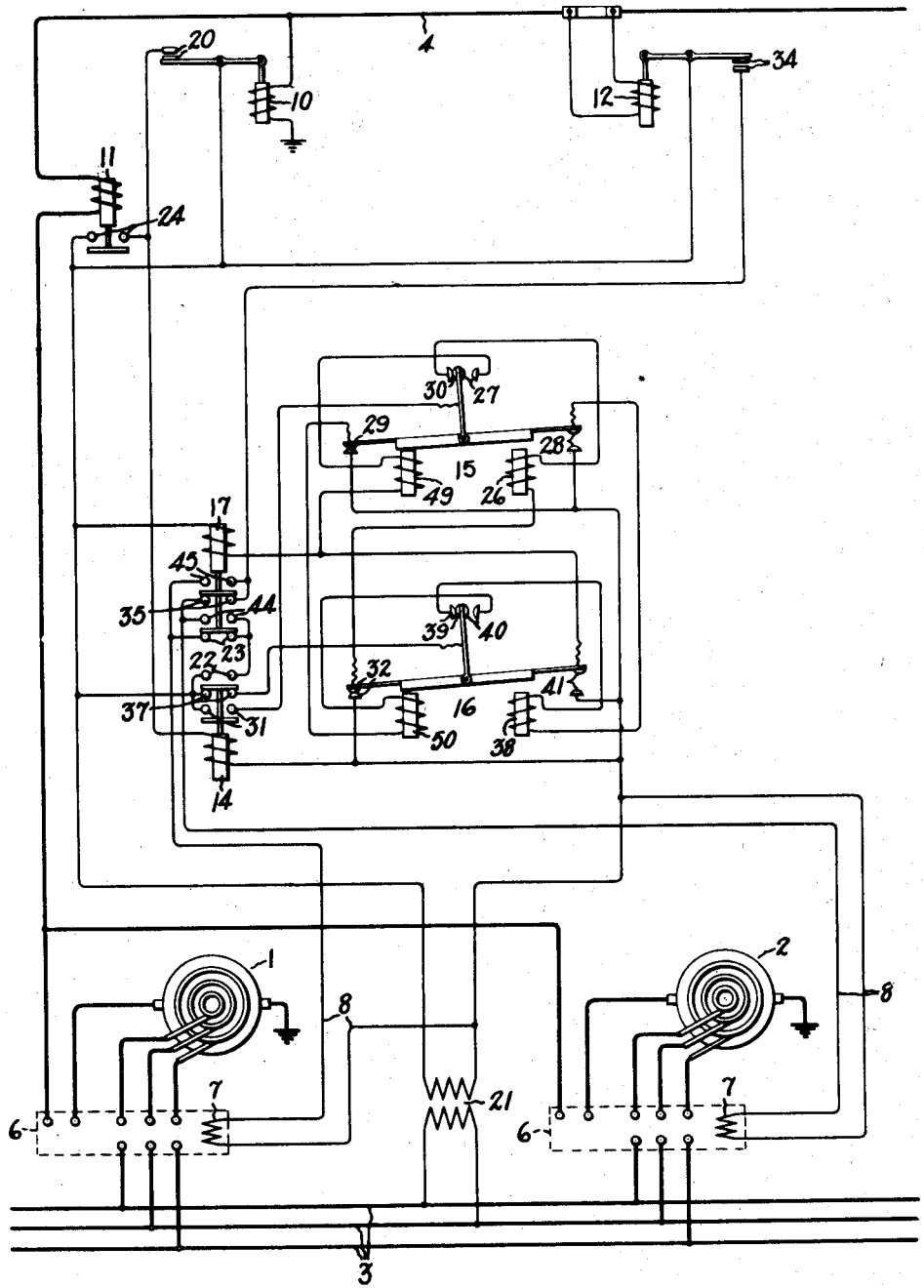
Inventor:
Harold T. Seeley,
by Charles E. Tullar
His Attorney.

Patented June 26, 1934

1,964,536

UNITED STATES PATENT OFFICE 1,964,536

CONTROL SYSTEM

Harold T. Seeley, Yeadon, Lansdowne, Pa., assignor to General Electric Company, a corporation of New York Application May 1, 1929, Serial No. 359,702

6 Claims. (Cl. 171—118)

My invention relates to control systems and particularly to systems for controlling the sequence in which a plurality of translating devices are operated.

In multiple unit substations for example it is desirable to equalize the wear on the units as much as possible and since the load on the station usually varies so that some of the units are in use only a portion of the time, it is necessary in order to accomplish this result to change the sequence in which the units are placed in operation. Heretofore, this selection of the order in which the units are operated has been done manually. One object of my present invention is to provide an arrangement whereby the selection is made automatically under predetermined conditions.

My invention will be better understood from the following description when taken in connection with the accompanying drawing and its scope will be pointed out in the appended claims.

Referring to the drawing which shows diagrammatically a control arrangement for a plurality of synchronous converters, which embodies my invention, 1 and 2 represent two synchronous converters which are adapted to be connected between an alternating current supply circuit 3 and a direct current load circuit 4. While I have shown my invention in connection with a control arrangement for synchronous converters, it is to be understood that it may be used with control arrangements for any type of translating device. Furthermore, while I have shown my invention in connection with a control arrangement for a two-unit substation, it is obvious that it is applicable to multiple unit stations having any number of units.

In order that each synchronous converter may be automatically connected to and disconnected from the circuits 3 and 4, each converter may be provided with any suitable automatic switching means. Such automatic switching means, in which the connection of a translating device is effected in response to the energization of a master relay connected in a starting circuit associated with the translating device and in which the disconnection of the translating device is effected in response to the deenergization of the master relay, are old and well known in the art. Since the details of such well known automatic switching means constitute no part of my present invention, I have schematically indicated such means in the drawing by a dotted rectangle 6 containing a coil 7 which represents the coil of the master relay in the circuit of the associated starting circuit 8.

For controlling the sequential operation of the automatic switching means 6, any suitable sequentially operable control means examples of which are well known in the art may be provided. In the particular arrangement shown I have provided control means responsive to predetermined electrical conditions of the load circuit 4 for controlling the operation of the converters 1 and 2 but it is obvious that any of the suitable means either automatically or manually controlled may be employed.

As shown, a contact making voltmeter 10 responsive to the voltage of the load circuit 4, is provided for effecting the starting of the leading converter in the substation when the load circuit voltage decreases below a predetermined value and a contact making ammeter 11, responsive to the current output of the station, is provided for effecting the stopping of the leading converter when the current output of the station decreases below a predetermined value. A second contact making ammeter 12, responsive to the current output of the station, is provided for effecting the starting of the trailing converter when the current output of the leading converter exceeds a predetermined value and for stopping the trailing unit when the total current output of the two converters is below a predetermined value.

In order to change automatically the order in which the converters 1 and 2 are operated so that the converter 1 is the leading unit and the converter 2 is the trailing unit some of the time and the converter 2 is the leading unit and the converter 1 is the trailing unit some of the time, I provide a control relay 14 which is controlled by the control relays 10 and 11 so that the relay 14 is energized whenever the voltage relay 10 operates to effect the starting of the leading unit of the station and the relay 14 is deenergized when the current responsive relay 11 operates to effect the stopping of the leading unit. The energization and subsequent deenergization of the control relay 14 are arranged to control the operation of suitable control relays 15, 16 and 17 so that the control of the starting circuit 8 associated with the converter 1 is alternately shifted from the relays 10 and 11 to the relay 12 and then back to the control relays 10 and 11 and the control of the starting circuit 8 associated with the converter 2 is shifted from the control relay 12 to the control relays 10 and 11 and then back to the control relay 12.

The control relays 15 and 16 are shown as two position relays having two operating coils, one of which when energized moves its respective relay to one of its positions and the other of which when energized moves the respective relay to its other position. Each of these two relays 15 and 16 is arranged so that when both of its windings are deenergized it remains in the position to which it was last moved.

The control relays 14 and 17 are shown as ordinary single coil relays and are so arranged that when the control relay 14 is energized and the control relay 17 is deenergized the starting circuit associated with the converter 1 is completed and the starting circuit 8 associated with the converter 2 is placed under the control of the control relay 12. When both of the control relays 14 and 17 are simultaneously energized the starting circuit 8 associated with the converter 2 is completed and the starting circuit 8 associated with the converter 1 is placed under the control of the control relay 12.

The energization of the control relay 17 is controlled by the relays 15 and 16 which, in turn, are controlled by the energization and deenergization of the control relay 14. When the control relay 17 is deenergized the energization and subsequent deenergization of the control relay 14 effects the operation of the control relays 15 and 16 so that the control relay 16 completes an energizing circuit for the control relay 17. When the control relay 17 is energized the subsequent energization and deenergization of the control relay 14 effects the operation of the control relays 15 and 16 so that the control relay 17 is deenergized. Therefore, it will be observed that each time the control relay 14 is energized and deenergized it changes the energization of the control relay 17 so that the sequence in which the converters 1 and 2 are operated is automatically varied.

The operation of the arrangement shown in the drawing is as follows:

When the converters 1 and 2 are shut down and the control relays 15, 16 and 17 are in the positions shown in the drawing, a predetermined decrease in the load circuit voltage is arranged to effect the starting of the converter 1. When the load circuit voltage decreases below the predetermined value the voltage relay 10 closes its contacts 20 and connects the coil of the control relay 14 across a suitable source of current shown as the secondary winding of a potential transformer 21, the primary of which is connected across the supply circuit 3. The control relay 14 by closing its contacts 22 connects the starting circuit 8 associated with the converter 1 across the secondary terminals of the transformer 21. This circuit also includes the contacts 23 of the control relay 17 which is deenergized at this time. The energization of the starting circuit 8 associated with the converter 1 effects the operation of the automatic switching means 6 associated therewith so that the converter 1 is started and is connected to the load circuit 4. As soon as the converter 1 is connected to the load circuit and current flows from the converter 1 to the load circuit the current responsive relay 11, which responds to a relatively small value of current, closes its contacts 24 which are in parallel with contacts 20 of the voltage relay 10 so that the control relay 14 is not deenergized when the voltage relay 10 opens its contacts 20 due to the load circuit voltage being restored to normal.

The energization of the control relay 14 also completes an energizing circuit for the operating winding 26 of the control relay 15 so that the relay is moved to its other position in which the contacts 27 and 28 of the relay are closed and the contacts 29 and 30 of the relay are open. The energizing circuit of the coil 26 which is connected across the secondary of the transformer 21 includes the contacts 31 of the control relay 14, contacts 30 of the relay 15 and the contacts 32 of the control relay 16. The relay 15 by opening its contacts 30, opens the circuit of the coil 26 so that it is deenergized when the relay reaches its other position.

If the current output of the converter 1 exceeds a predetermined value, the current responsive relay 12 closes its contacts 34 and connects the contacts 35 of the deenergized relay 17 and the starting circuit 8 associated with the converter 2 in series across the secondary terminals of the transformer 21. The energization of the starting circuit 8 associated with the converter 2 effects the operation of the automatic switching means 6 associated with the converter 2 so that it is started and is connected to the load circuit 4.

When the total current output of the two converters 1 and 2 decreases below a predetermined value the current responsive relay 12 opens its contacts 34 and effects the deenergization of the starting circuit 8 associated with the converter 2 so that the automatic switching means 6 associated therewith effects the shutting down of the converter 2.

When the current output of the converter 1 decreases below a predetermined value the current responsive relay 11 opens its contacts 24 in the energizing circuit of the control relay 14. The control relay 14 by opening its contacts 22 deenergized the starting circuit 8 associated with the converter 1 so that the automatic switching means 6 associated therewith effects the shutting down of the converter 1. The control relay 14 by closing its contacts 37 completes an energizing circuit for the operating coil 38 of the control relay 16 so that this relay is moved into its other operating position in which position the relay contacts 32 and 39 are open and the relay contacts 40 and 41 are closed. This energizing circuit of the coil 38 which is connected across the secondary terminals of the transformer 21 also includes the contacts 39 of the relay 16 and the contacts 28 of the control relay 15. The control relay 16 by closing its contacts 41 connects the operating coil of the control relay 17 across the secondary terminals of the transformer 21 so that this relay is in its energized position when the control relay 14 is subsequently energized in response to the operation of the voltage relay 10. The relay 17 by opening its contacts 23 and 35 and closing its contacts 44 and 45 transfers the control of the starting circuits 8 so that the converter 2 becomes the leading unit and the converter 1 becomes the trailing unit.

When the load circuit voltage again decreases below a predetermined value so that the voltage relay 10 closes its contacts 20 and completes the energizing circuit of the control relay 14, the closing of the contacts 22 of the relay 14 now connects the contacts 44 of the energized relay 17 and the starting circuit 8 associated with the converter 2 in series across the secondary terminals of the transformer 21. The converter 2 therefore now operates as the leading unit.

When the current output of the converter 2 exceeds a predetermined value so that the current responsive device 12 closes its contacts 34, the starting circuit 8 associated with the converter 1 is completed across the secondary terminals of the transformer 21 through the contacts 45 of the energized control relay 17, to effect the operation of the converter 1 as the trailing unit.

When the control relay 14 is energized to effect the starting of the converter 2, the closing of the contacts 31 of the relay 14 completes a circuit for the operating coil 49 of the control relay 15 to restore it to the position shown in the drawing. This circuit which is completed across the secondary terminals of the transformer 21 also includes the contacts 31 of the control relay 14, contacts 27 of the relay 15 and contacts 41 of the control relay 16.

When the current output of the converter 2 decreases to a sufficient value to cause the control relay 11 to open its contacts 24 and effect the deenergization of the control relay 14, the control relay 14, by opening its contacts 22 effects the deenergization of the starting circuit 8 associated with the converter 2 so that the automatic switching means 6 associated therewith effects the shutting down of the converter 2.

The deenergization of the control relay 14 under these conditions also effects the energization of the operating coil 50 of the relay 16 so that the relay 16 is restored to the position shown in the drawing. The energizing circuit for the coil 50, which is connected across the secondary terminals of the transformer 21, also includes the contacts 37 of the control relay 14, contacts 40 of the relay 16, and contacts 29 of the relay 15. The relay 16 by opening its contacts 41 effects the deenergization of the control relay 17 so that when the control relay 14 is again energized to effect the operation of the leading unit of the substation the converter 1 is started instead of the converter 2 and the converter 2 is started in response to the operation of the control relay 12.

It will be observed from the above description that in the embodiment of my invention shown in the drawing, the sequence in which the units are operated is automatically changed in response to the starting and stopping of the leading unit.

While I have, in accordance with the patent statutes, shown and described by invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit, a plurality of sources of current, automatic switching means associated with each source for effecting the connection and disconnection thereof to and from said circuit, a plurality of sequentially operable control means for controlling the operation of said automatic switching means, and means controlled by said control means for automatically changing the order in which said switching means are operated in response to the sequential operation of said control devices.

2. In combination, an electric circuit, a plurality of sources of current, automatic switching means associated with each source for effecting the connection and disconnection thereof to and from said circuit, means including a control relay normally arranged when said control relay is energized to effect the operation of one of said automatic switching means to connect the associated source to said circuit and when said control relay is subsequently deenergized to effect the operation of said one of said automatic switching means to disconnect the associated source from circuit, and means controlled by the energization and subsequent deenergization of said control relay for removing the control of said one of said automatic switching means from said control relay and for placing another automatic switching means under the control of said control relay so that the next energization and subsequent deenergization of said control relay effects the connection and disconnection of the source associated with said last mentioned switching means.

3. In combination, an electric circuit, a plurality of sources of current, automatic switching means associated with each source for controlling the connection thereof to said circuit having a starting circuit which when energized effects the operation of the associated switching means to effect the connection of the associated source to said circuit and which when deenergized effects the operation of the associated switching means to effect the disconnection of the associated source from said circuit, control means for effecting the energization and deenergization of one of said starting circuits, and means controlled by said control means for removing said one of said starting circuits from the control of said control means and for placing another of said starting circuits under the control of said control means after said control means has effected the energization and subsequent deenergization of said one of said starting circuits.

4. In combination, two sources of current, an electric circuit switching means associated with each source for connecting it to said circuit, control means normally arranged to effect the operation of one of said switching means to connect the associated source to and to disconnect the associated source from said circuit, other control means normally arranged to effect the operation of the other switching means to control the connection between the associated source and said circuit, and means controlled by said control means for transferring the control of each switching means from one control means to the other.

5. In combination, an electric circuit, two translating devices, control means normally arranged when operated in a predetermined manner to effect the connection of one of said translating devices to said circuit and the subsequent disconnection of said one of said translating devices from said circuit, and means controlled by said control means for effecting the connection and subsequent disconnection of the other translating device in response to the subsequent operation of said control means in said predetermined manner after said one of said translating devices has been disconnected from said circuit by said control means whereby successive operations of said control means in said predetermined manner effects the connection and disconnection of different translating devices to and from said circuit.

6. In combination, an electric circuit, two translating devices, control means normally arranged when operated in a predetermined manner to effect the connection of one of said translating devices to said circuit and the subsequent disconnection of said one of said translating devices from said circuit, and means controlled by said control means when it effects the disconnection of said one translating device from said circuit for removing said one of said translating devices from the control of said control means and for placing the other of said translating devices under the control thereof so that the subsequent operation of said control means in said predetermined manner after said one of said translating devices is disconnected from the electric circuit effects the connection and subsequent disconnection of said other translating device to and from said circuit.

HAROLD T. SEELEY.